(12) United States Patent
Androulaki et al.

(10) Patent No.: US 11,362,842 B2
(45) Date of Patent: Jun. 14, 2022

(54) MEMBERSHIP COMPILER FOR APPLICATIONS

(71) Applicant: International Business Machines Corporation, Armonk, NY (US)

(72) Inventors: Elli Androulaki, Zürich (CH); Angelo De Caro, Zürich (CH)

(73) Assignee: International Business Machines Corporation, Armonk, NY (US)

( * ) Notice: Subject to any disclaimer, the term of this patent is extended or adjusted under 35 U.S.C. 154(b) by 567 days.

(21) Appl. No.: 16/134,705

(22) Filed: Sep. 18, 2018

(65) Prior Publication Data
US 2020/0092114 A1 Mar. 19, 2020

(51) Int. Cl.
| | |
|---|---|
| H04L 9/00 | (2022.01) |
| H04L 9/32 | (2006.01) |
| H04L 9/40 | (2022.01) |
| H04L 9/06 | (2006.01) |
| G06F 21/64 | (2013.01) |
| G06F 21/62 | (2013.01) |
| G06F 16/18 | (2019.01) |

(52) U.S. Cl.
CPC ........ *H04L 9/3268* (2013.01); *G06F 16/1805* (2019.01); *G06F 21/629* (2013.01); *G06F 21/64* (2013.01); *H04L 9/0643* (2013.01); *H04L 63/101* (2013.01); *G06F 2221/2141* (2013.01); *H04L 2209/38* (2013.01)

(58) Field of Classification Search
CPC .................................................. H04L 9/3268
See application file for complete search history.

(56) References Cited

U.S. PATENT DOCUMENTS 8,069,180 B1 * 11/2011 Moore .................. G06Q 10/10
707/759
9,397,985 B1 7/2016 Robert et al.
(Continued)

FOREIGN PATENT DOCUMENTS

WO 2017090041 A1 6/2017

OTHER PUBLICATIONS

Androulaki, E., Barger, A., Bortnikov, V., Cachin, C., Christidis, K., De Caro, A& Yellick, J. (2018, April). Hyperledger fabric: a distributed operating system for permissioned blockchains. In Proceedings of the thirteenth EuroSys conference (pp. 1-15). (Year: 2018).*

(Continued)

*Primary Examiner* — Jeffrey Nickerson
*Assistant Examiner* — Syed M Ahsan

(57) ABSTRACT

An example operation may include one or more of evaluating a proposed membership conversion submitted by a client application (App) on a client subject to a first membership services provider ($MSP_1$), evaluating the validity of the client according to channel membership rules, placing a transaction certificate in a creator field of a client transaction request, using fabric-attribute-based authentication to authenticate the client that submitted the membership conversion proposal, consulting a membership table to determine access rights of the client, and passing the access rights information to an application membership credential generator compliant with a second membership services provider ($MSP_2$).

20 Claims, 5 Drawing Sheets

(56) References Cited

U.S. PATENT DOCUMENTS

| | | |
|---|---|---|
| 9,635,000 B1 | 4/2017 | Muftic |
| 2017/0149819 A1 | 5/2017 | Androulaki et al. |
| 2017/0155515 A1 | 6/2017 | Androulaki et al. |
| 2020/0004846 A1* | 1/2020 | Camenisch .......... H04L 9/3239 |
| 2020/0043115 A1* | 2/2020 | Nelson ................. H04L 9/3239 |

OTHER PUBLICATIONS

Christian Cachin, "Architecture of the Hyperledger Blockchain Fabric," IBM Research—Zurich. Retrieved from Internet using: https://pdfs.semanticscholar.org/f852/c5f3fe649f8a17ded391df0796677a59927f.pdf.

Chrysoula Stathakopoulou, and Christian Cachin, "Threshold Signatures for Blockchain Systems," (2017). Retrieved from Internet using: https://domino.research.ibm.com/library/cyberdig.nsf/papers/CA80E201DE9C8A0A852580FA004D412F/$File/rz3910.pdf.

Marko Vukolić, "Rethinking Permissioned Blockchains," In Proceedings of the ACM Workshop on Blockchain, Cryptocurrencies and Contracts, pp. 3-7. ACM, 2017. Retrieved from Internet using: http://www.vukolic.com/rethinking-permissioned-blockchains-BCC2017.pdf.

Shinsaku Kiyomoto, Mohammad Shahriar Rahman, and Anirban Basu, "On blockchain-based anonymized dataset distribution platform," In Software Engineering Research, Management and Applications (SERA), 2017 IEEE 15th International Conference on, pp. 85-92. IEEE, 2017.

* cited by examiner

MEMBERSHIP COMPILER FOR APPLICATIONS

TECHNICAL FIELD

This disclosure generally relates to membership data, and more particularly to a membership compiler for applications.

BACKGROUND

A distributed ledger is a type of database that is shared, replicated, and synchronized among members of a decentralized network. The distributed ledger records transactions, such as an exchange of assets or data, among the participants in the network. The participants agree by consensus on any updates to the records in the ledger. No central authority or third-party mediator, such as a financial institution or clearinghouse, is involved. A record of every transaction is added to a data entity called a block. Every block has a timestamp and a unique cryptographic hash digest. The blocks are linked together using the hash digests in an ordered sequence called a blockchain. The blockchain thus constitutes a ledger that contains an auditable, immutable history of all transactions between participants in the network.

In general, business activity may take place in public or private networks, that may span national, geographic, and jurisdictional boundaries. Business networks typically come together at marketplaces where the participants, such as producers, assemblers, suppliers, partners, market makers, consumers, and other stakeholders own, control, and exercise their rights, privileges, duties, and obligations on objects of value referred to herein as assets. Assets can be tangible or "physical", such as manufactured parts, subassemblies, and finished products, or intangible or "virtual", such as digital blueprints and certificates of authenticity.

Transactions typically involve various participants like buyers, sellers, and intermediaries (such as banks, auditors, or notaries) whose business agreements and contracts are recorded in ledgers. That is, ledgers are the systems of record for a business's economic activities and assets. But traditional methods of maintaining ledgers are inefficient, costly, and subject to misuse and tampering.

SUMMARY

One example embodiment may provide a method that includes one or more of evaluating a proposed membership conversion submitted by a client application (App) on a client subject to a first membership services provider ($MSP_1$), evaluating the validity of the client according to channel membership rules, placing a transaction certificate in a creator field of a client transaction request, using fabric-attribute-based authentication to authenticate the client that submitted the membership conversion proposal, consulting a membership table to determine access rights of the client, and passing the access rights information to an application membership credential generator compliant with a second membership services provider ($MSP_2$).

Another example embodiment may provide a system, comprising a processor, memory accessible to the processor, and computer program instructions stored in the memory and executable by the processor to perform one or more of evaluate a proposed membership conversion submitted by a client application (App) on a client subject to a first membership services provider ($MSP_1$) evaluate the validity of the client based on channel membership rules, place a transaction certificate in a creator field of a client transaction request, use fabric-attribute-based authentication to authenticate the client that submitted the membership conversion proposal, consult a membership table to determine access rights of the client, and pass the access rights information to an application membership credential generator compliant with a second membership services provider ($MSP_2$).

A further example embodiment may provide a non-transitory computer readable medium comprising instructions that, when read by a processor, cause the processor to perform one or more of evaluating a proposed membership conversion submitted by a client application (App) on a client subject to a first membership services provider ($MSP_1$); evaluating the validity of the client according to channel membership rules; placing a transaction certificate in a creator field of a client transaction request; using fabric-attribute-based authentication to authenticate the client that submitted the membership conversion proposal; consulting a membership table to determine access rights of the client; and passing the access rights information to an application membership credential generator compliant with a second membership services provider ($MSP_2$).

BRIEF DESCRIPTION OF THE DRAWINGS

The details of the disclosed embodiments with regard to their structure, function, and operation, can be better understood by referring to the accompanying drawings, in which like reference numbers and designations refer to like elements. The drawings, together with the written description, serve to explain the principles of the application, the scope of which is determined by the claims.

In the drawings.

DETAILED DESCRIPTION

Figure 1:
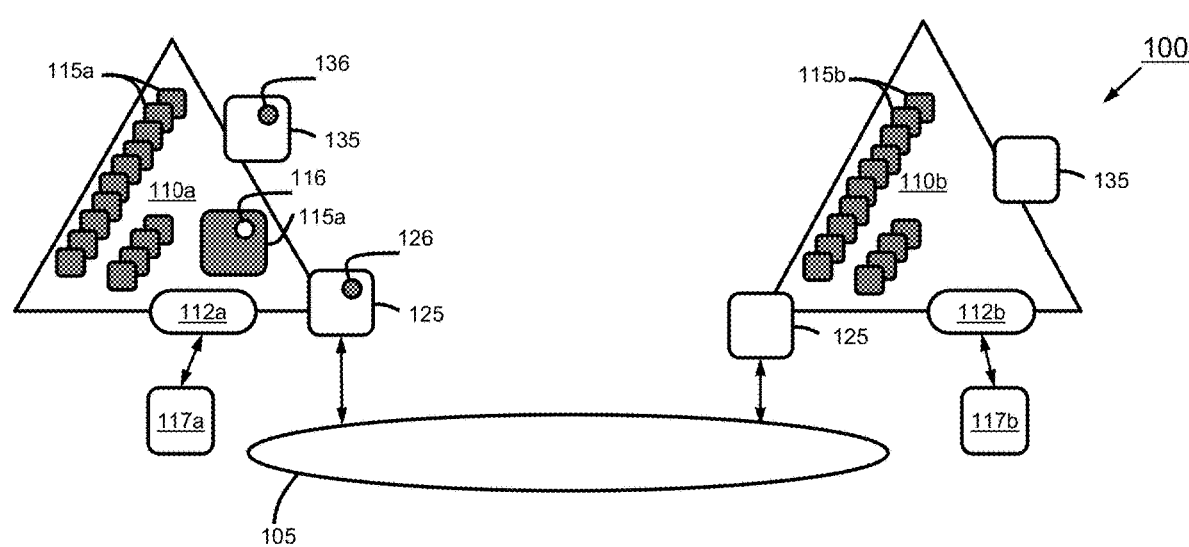
FIG. 1 is a block diagram of an exemplary hyperledger fabric 100 on which aspects of the disclosed embodiments may be realized.

It is to be understood that the figures and descriptions provided herein may have been simplified to illustrate aspects that are relevant for a clear understanding of the herein described embodiments and aspects, while eliminating, for the purpose of clarity, other aspects that may be found in typical devices, systems, and methods. Those of ordinary skill in the pertinent art may recognize that other elements and/or steps may be desirable and/or necessary to implement the devices, systems, and methods described herein. Because such elements and steps are well known in the art, and because they do not facilitate a better understanding of the present disclosure, a discussion of such elements and steps may not be provided herein. However, the present disclosure is deemed to inherently include all such elements, variations, and modifications to the described embodiments and aspects that would be known to those of ordinary skill in the pertinent art.

It will be readily understood that elements of the present application as generally described and illustrated, may be arranged and designed in a wide variety of different configurations. Thus, the following detailed descriptions and illustrations are not intended to limit the scope of the application, but are merely representative of certain exemplary embodiments and aspects of the application.

The features, structures, and characteristics of the application described throughout this specification may be combined in any suitable manner in one or more embodiments. Usage of the phrases "exemplary embodiments", "embodiments", "aspects", or other similar language throughout this specification refers to the fact that a particular described feature, structure, or characteristic may be included in at least one embodiment of the present application. Thus, the appearance of references to embodiments and aspects throughout this specification do not necessarily all refer to the same group of embodiments, and the described features, structures, or characteristics may be combined in any suitable manner in one or more embodiments. In addition, the term "message" may also include block, packet, frame, datagram, and the like. The application is not limited to a certain type of message or a certain type of signaling.

A variety of embodiments and aspects will now be described. These are provided as teaching examples, and should not be interpreted to limit the scope of the application as defined by the claims. Although specific details of exemplary embodiments are presented, these embodiments may be modified by changing, supplementing, or eliminating many of these details.

The blockchain of the instant application is a tamper-evident, shared digital ledger. It keeps records of transactions and other asset-related events in a peer-to-peer, permissioned, public or private network, and is distributed to all member nodes in the network. The ledger permanently records, in an ordered sequence of cryptographic hash-linked blocks, the history of asset-related events that take place between the peers in the network. All of the transaction blocks must be validated by most or all of the nodes on the network before they can be added to a block, and every block is replicated to all member nodes on the network and appended to their respective blockchain. All of the blocks of every instance of the blockchain are linked from the genesis (first) block to the most recently added block. The blockchain thus acts as a single source of truth among all participants, regardless of their role in the transactions.

Blockchains are modified by a process called "consensus", which ensures that all shared ledgers are exact copies of each other. This drastically reduces the risk of fraudulent transactions because tampering would have to occur at many places at exactly the same time. Cryptographic hashes ensure that any alteration to any transaction, no matter how small, results in a different hash value being computed, which reveals a compromised transaction record. Digital signatures can also be used to ensure that transactions originated from authorized parties, and not imposters.

Hyperledger is an open source initiative to advance blockchain technologies for business use. Its goal is to create an open, standardized, enterprise-grade distributed ledger framework and code base. The Hyperledger Fabric framework supports distributed ledger solutions on permissioned networks, i.e. networks where the members are known to each other. Its modular architecture enhances the confidentiality, resilience, and flexibility of blockchain solutions. The distributed ledger protocol of the fabric is run by peers. The fabric distinguishes between two kinds of peers. A validating peer is a node on the network that participates in consensus, validates transactions, and maintains the ledger. A non-validating peer is a node that functions as a proxy to connect clients (that issue transactions) to validating peers. A non-validating peer does not execute transactions, but it may verify them.

The hyperledger fabric supports smart contracts embodied in encapsulated chaincode. Its consensus protocol is a pluggable implementation that supports the so-called practical *Byzantine* fault-tolerant (PBFT) protocol. Its security can be enforced through the use of certificate authorities (CAs), such as for transport layer security (TLS) certificates, enrollment certificates, and transaction certificates. It uses an event framework that supports both pre-defined and custom events, and a client SDK is available to interface with the fabric. Confidentiality for chaincodes and state is provided through symmetric-key encryption of transactions and states with a blockchain-specific key provided to all peers with an enrollment certificate for the blockchain.

A membership service provider (MSP) identifies root certificate authorities (RCAs) and intermediate certificate authorities (ICAs) that are trusted to define the members of a trust domain, such as an organization or a department, typically including identifying the certificate authorities (CAs) authorized to issue valid identities for their members. An MSP can also specify which roles an actor might have within the scope of the organization the MSP represents, and defines access privileges in the context of a network and channel (e.g., channel admins, readers, writers).

An MSP exists for every logical unit of a hyperledger fabric based network. The configuration of each MSP is advertised to all the members of the corresponding logical unit. For example, members of an organization reside on a single logical channel, and obtain member services pertaining to the channel from a single channel MSP. In addition, peers and clients may be members of other logical units, each of which has its own MSP that provides membership services for the logical unit. For example, authenticating member messages outside the context of a channel, or defining permissions regarding resources in the unit. An example is an MSP that defines who may install chaincode on a peer.

In a hyperledger fabric, an organization is a managed group of members. This is true regardless of the scale of the organization, whether a multinational corporation or a small business. Members of the organization are managed under a single MSP, and the MSP provides services only to that organization's members. It may be that an organization is arranged into multiple membership groups that perform very different business functions, all of which use the same channel. It may be desirable for some or all of the business functions to have their own respective MSP. For example, the manufacturing group of an organization may have its own MSP (e.g., $ORG_1$-MANUF-MSP) and the legal department may have its own MSP (e.g., $ORG_1$-LEGAL-MSP), which may reflect different levels of trust within the organization.

Thus, the hyperledger fabric membership architecture allows for a variety of membership service providers to co-exist, each of which represents a different logical group, and each of which has its own membership architecture, rules, configuration, and the like. Members of one MSP may authenticate themselves to members of other MSPs, for example for transaction authentication, channel access control, smart contract (chaincode) access control, and the like.

It is desirable that a membership architecture in the hyperledger fabric should be pluggable, easily extensible, and allow smooth co-existence of a plurality of MSPs, each potentially corresponding to a different organization. However, such an architecture comes with an important vulnerability. For an identity to prove its validity, it has to reveal the membership provider it belongs to. Depending on the configuration, it may also need to reveal the associated organization. Transactions in the hyperledger fabric are signed by secrets associated to respective identities. As such, it may be possible to monitor the chain data and potentially determine which transactions are part of an organization's activity.

A blockchain network in a hyperledger fabric is governed by a plurality of distinct membership service providers (MSPs). In disclosed embodiments, a membership overlay for hyperledger fabric applications is provided to smooth out, or redistribute, platform-level membership inhomogeneities. The overlay may enhance the anonymity of transactions associated to a certain application, for example. The framework realizes a membership overlay that an application may leverage to normalize membership activity across a plurality of organizations, or to enhance member anonymity with regard to a set of blockchain transaction participants.

A set of new protocols is also disclosed, and their implementation on the Hyperledger Fabric platform is described. The protocols offer membership services to an application that can identify and process only a certain type of credentials (i.e., has a certain membership architecture), but has clients that are members of other organizations that may have different membership standards. The protocols provide transparent membership translation mechanisms to transition from the architecture and features of the default MSP to another membership architecture. Thereby, several aspects of the hyperledger fabric platform that may be exploited to reveal member or organization information are improved. Anonymity and privacy of clients are enhanced with respect to their transactional activity with a specific application. This is especially true with regard to parties on the same channel or blockchain that the application's chaincode is on, but have no authorization to access other data. Importantly, these benefits are achieved while maintaining compatibility with cryptographic and other standards (e.g., the use of cryptographic material stored in a card or the like is unaffected), and without substantially modifying the Hyperledger Fabric platform.

In addition, extensions of the framework are disclosed that support, in the membership translation process, the integration of application-specific attributes, identity roles, and the like, such that application-level role-based access control is straightforward. The privacy and confidentiality of such attributes and roles are maintained during integration, ensuring that only authorized parties, endorsers, and chaincodes can access protected resources.

Alternative solutions to achieving similar anonymity properties exist, for example the use of group signatures, or using an existing primitive to hide the signer of a certain message (e.g., a certificate) within a set of authorized members of a group. However such solutions have undesirable properties that are avoided by the disclosed embodiments. For example, they are inefficient in their use of cryptographic resources compared to standard Elliptic Curve Digital Signature Algorithm (ECDSA) and RSA based signatures. For example, the size of keys may be proportional to the size of the organization they are used in. Further, such solutions may have only limited or no support for keys stored in a hardware security module (HSM), which are commonly used by many organizations. An HSM is a physical device that plugs into a computer port to safeguard and manage digital keys for strong authentication.

The following terms used herein:

ACL—Access Control List, which associates resources (such as system chaincode, APIs, or services) to a policy that defines how to access each resource. It is part of a channel's configuration, and persists in the channel's configuration blocks. An ACL is formatted as a list of key-value pairs, where the key identifies a resource and the value identifies a group whose members are allowed to access it.

Block—An ordered set of transactions that is cryptographically linked to the preceding block in a chain.

Chain—A transaction log structured as hash-linked blocks. Each block contains records of transactions that are ordered by an ordering service. Peers receive a new block from the ordering service, mark the block's transactions as valid or invalid based on endorsement policies, and append the block to the blockchain on the peer's file system.

Chaincode—Program code that functions as a trusted distributed application, which gains its security and trust from the blockchain and consensus among the peers.

Channel—A private blockchain overlay that promotes data isolation and confidentiality. Parties must be properly authenticated to a channel in order to use it. A channel-specific ledger is shared in the blockchain across peers in the channel.

Commitment—Each peer on a channel validates a newly created block of ordered transactions, then commits (appends) the block to its copy of the channel ledger.

Consensus—An agreement among most or all of the peers on a channel confirming the correctness of a set of transaction records in a new block. Consensus is required before the block can be committed to the blockchain.

Consortium—A collection of organizations on the blockchain network. The organizations form and join channels and own peers. While a blockchain network can support multiple consortia, most networks have only one. All organizations added to a channel when it is created must be part of a consortium, but additional organizations may be added to an existing channel that are not part of a consortium.

Dynamic Membership—The hyperledger fabric supports the addition and removal of members, peers, and ordering service nodes, without compromising the operation of the network.

Endorsement—A process in which peer nodes, specified in a chaincode application endorsement policy, execute a transaction of the chaincode application, and return a proposal response to the client running the application. The proposal response includes the chaincode execution response message, its results (i.e., its read set and write set), and its events, as well as a signature to prove the peer executed the chaincode.

Endorsement policy—A policy that identifies the peer nodes on a channel that must execute a chaincode application transaction to endorse the transaction; and defines the combination of responses (endorsements) required to add the transaction to a new block. For example, an endorsement policy may require that a transaction be endorsed by a minimum number of endorsing peers, or a minimum percentage of endorsing peers, or by all of the endorsing peers identified for a specific chaincode application. Policies can be curated based on the application and the desired level of resilience against misbehavior (deliberate or not) by the endorsing peers. A transaction that is submitted must satisfy the endorsement policy before it can be marked as valid by committing peers. A distinct endorsement policy is used for install and instantiate transactions.

Hyperledger Fabric CA—A default certificate authority (CA) that issues public key infrastructure (PKI)-based certificates to network member organizations and users. The CA issues a root certificate (rootCert) to each member, and an enrollment certificate (ECert) to each authorized user.

Genesis Block—A configuration block that serves as the first block on a chain, or that initializes the ordering service.

Initialize—A method to prepare a chaincode application for execution.

Install—The process of placing a chaincode application on a peer's file system.

Instantiate—The process of initializing and launching a chaincode application on a specific channel. After a peer instantiates a chaincode application, it can accept invocations of the application's chaincode.

Invoke—Calling chaincode functions. A client application invokes chaincode by sending a transaction proposal to a peer. The peer executes the chaincode and returns an endorsed proposal response to the client application. The client application gathers proposal responses from different peers until it has enough to satisfy an endorsement policy. It then submits the transaction results for ordering, validation, and commitment. The invoke includes a channel identifier, the chaincode function to invoke, and function arguments.

Ledger—A blockchain ledger consists of a blockchain and a state database, or "world state". Blockchains are immutable, meaning after a block has been added to the chain, it cannot be changed. The "world state" contains the current state of the key-value pairs that have been added, modified, or deleted by the validated and committed transactions in the blockchain. Each peer in a channel maintains its own copy of the ledger, which is kept consistent with every other peer's copy through the consensus process.

Membership Service Provider (MSP)—An element of the hyperledger system that provides credentials to clients and peers so they can participate in the hyperledger fabric network. Clients use their credentials to authenticate their transactions. Peers use their credentials to authenticate transaction processing results (endorsements). Preferably, an MSP defines its membership services in such a way that alternate MSP implementations can be plugged in without modifying the transaction processing elements of the system.

Membership Services—Services that authenticate, authorize, and manage identities on a permissioned blockchain network. Membership Services code runs in peers and orderers to authenticate and authorize blockchain operations.

Ordering Service—A service that determines the order in which new transactions are included in a new block. The ordering service is independent of peer processes, and orders transactions on a first-come-first-serve basis for all channels on the network.

Organization—Entities invited by a blockchain service provider to join the blockchain network. An organization is joined to a network by adding its MSP to the network. A first organization's MSP defines how other organizations on the network verify that transactions were generated by a valid identity of the first organization. The particular access rights of identities within an MSP are governed by policies established when the organization is joined to the network. The transaction endpoint of an organization is called a peer. A collection of organizations may form a consortium.

Peer—A network entity that maintains a ledger and runs chaincode containers to perform read and write operations to the ledger. Peers are owned and maintained by members.

Policy—Policies are expressions of the properties of digital identities. They are used to restrict access to resources on a blockchain network. For instance, they dictate who can read from or write to a channel, or who can use a specific chaincode API via an ACL. Policies may be defined in a configuration file when launching an ordering service or creating a channel, or they can be specified when instantiating chaincode on a channel.

Proposal—A request for endorsement that is aimed at specific peers on a channel. Each proposal is either an instantiate or an invoke (read/write) request.

Software Development Kit (SDK)—A structured environment containing code libraries application developers can use to develop chaincode applications. The SDK also provides APIs for transaction processing, membership services, node traversal, and event handling.

Smart Contract—Computer readable code invoked by a client application external to the blockchain network, that manages access to and modifications of key-value pairs in the World State. Smart contracts may be referred to as chaincode. Smart contract chaincode is installed onto peer nodes and instantiated on a channel.

System Chain—Contains a configuration block defining the network at a system level. The system chain lives within the ordering service, and similar to a channel, has an initial configuration containing information such as: MSP information, policies, and configuration details. Any change to the overall network (e.g. a new organization joining the blockchain network, or adding a new ordering node) will result in a new configuration block being added to the system chain.

Transaction—Invoke or instantiate results submitted for ordering, validation, and commit. Invokes are requests to read/write data from the ledger. Instantiates are requests to execute chaincode. Application clients gather invoke or instantiate responses from endorsing peers and package the results and endorsements into a transaction that is submitted for ordering, validation, and commit.

World State—Also known as the "current state", the world state consists of the current values of all of the keys included in the blockchain transaction log. Chaincode executes transaction proposals against the world state data rather than traversing the entire transaction log to determine the current value of a key. Peers update the world state data as they process validated transactions whenever a key value changes or a new key is added.

Furthermore, such alternative solutions may require a centralized key manager to distribute keys to members of a group. Such a key manager must be completely trusted, and is inconsistent with the distributed nature of blockchain. Moreover, they may force all organizations to use a specific type of credentials. This would preclude an organization using its own identity management architecture, a desirable feature that is not precluded by the disclosed embodiments.

Referring now to the figures, FIG. 1 is a block diagram of an exemplary hyperledger fabric 100 on which aspects of the disclosed embodiments may be realized. As shown, a single channel 105 provides a logical structure with which a plurality of organizations may communicate. For simplicity of illustration only two organizations 110*a* and 110*b* are shown, although a channel may support more organizations, or just one. Each organization has its own MSP, 112*a* and 112*b* respectively, which provides membership services exclusively to that organization and its end user members, 115*a* and 115*b*, respectively. A certificate authority (CA) 117*a* and 117*b*, respectively, provides certificates to the MSP 112 when needed by end users 115. The end users 115 may have installed thereon one or more client applications 116 (one is shown), and can issue transactions. The associated owning application 136 is installed on one or more fabric-clients 135. The owning application 136 trusts one or more peers 125 at which its chaincode 126 is installed. Further, the client application 116 may also be installed on one or more fabric clients (not shown), which can invoke chaincodes of the owning application 136. Some of the fabric clients 135 may be part of organizations other than that of the owning application, and so may exhibit trust levels different than fabric clients in the owning application's organization.

The owning application 136 installs on one or more end users 115a in the same organization 110a an "application membership chaincode", referred to herein as "appmem-cc" 116. This chaincode during its initialization takes as input a table containing information of the members of the owning application that it trusts. For example, the owning application may trust a plurality of MSPs 125.

The appmem-cc 116 processes membership transition requests, and provides transformed membership credentials. To do so, appmem-cc 116 accesses long-term credentials residing on the endorser side used solely for that chaincode. There are many ways through which endorsers may maintain secret or persistent information per chaincode off-chain. For example, endorsers may use an off-chain database that is supported by the hyperledger fabric, and is initialized with sensitive material during chaincode instantiation and initialization. Or, key-material may be built into the chaincode itself, and thereby is provided to peers when they install the chaincode.

Figure 2:
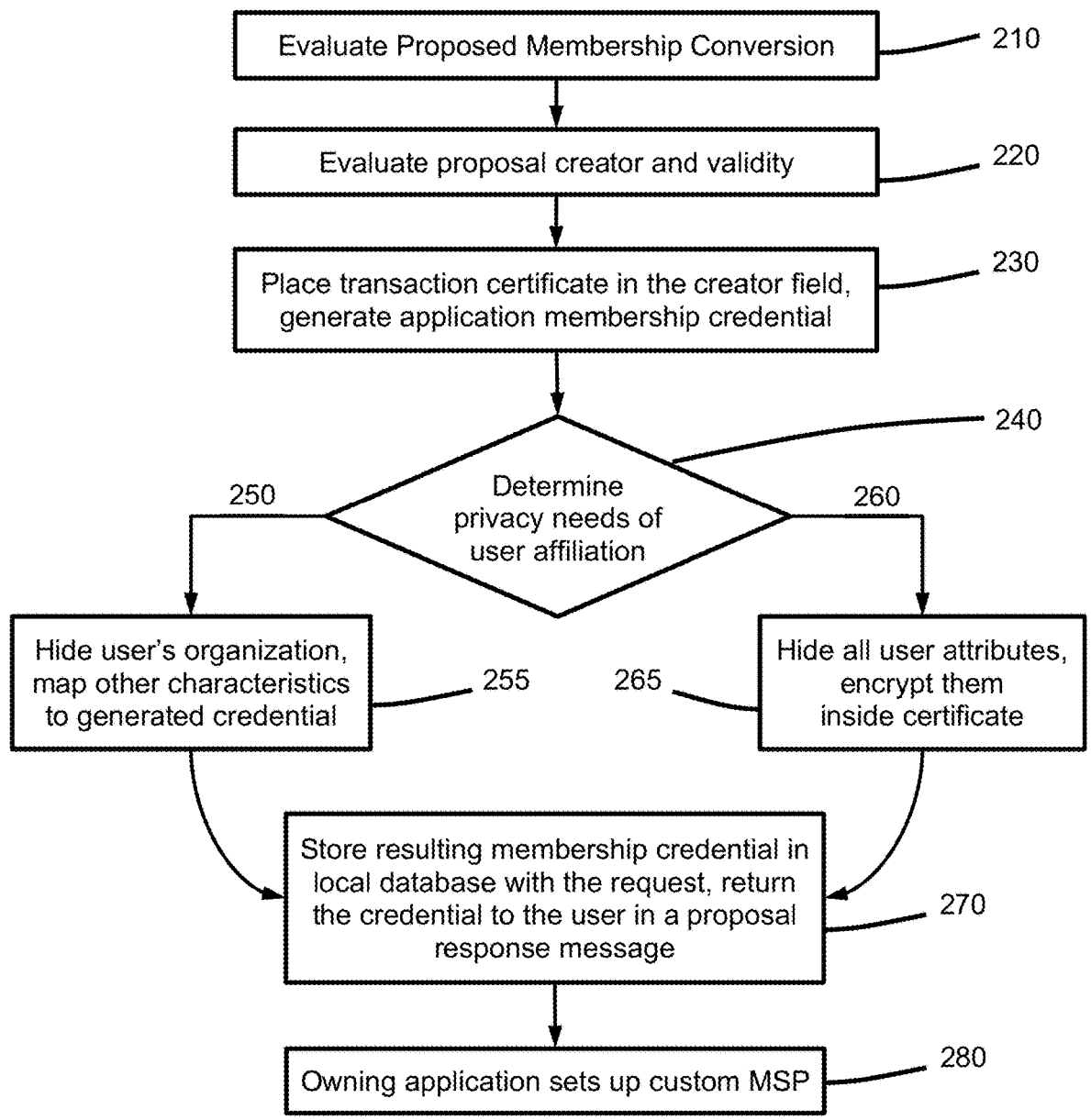
FIG. 2 is a flow diagram of an illustrative membership information conversion method.

FIG. 2 is a flow diagram 200 of an illustrative membership information conversion method. As shown, the membership transition function evaluates a proposed membership conversion 210, and evaluates the proposal creator and validity given the channel membership rules 220. A transaction certificate is placed in the creator field 230, so the chaincode can leverage fabric-attribute-based authentication mechanisms to fully authenticate the proposal creator. Subsequently the chaincode may consult its membership table to determine the access rights of the creator or the organization it belongs to with regard to the application. The access rights information may be passed on to the application membership credential generation function that abides by the rules of the application membership component.

At this point, one of two cases may be encountered, depending on privacy requirements of the user affiliation either alone or in conjunction with the user identity, 240. In one case, the organization the user comes from may be hidden, 250. In this case, the application membership may map any other user characteristics, to the membership characteristics of the generated credential (e.g., enrollment id, attributes, etc.), and an inherent namespace derived by the chaincode is also acquired, 255. Although the real affiliation of a user may still be guessed with a fairly high likelihood of being correct, the generated credential will not directly reveal it.

In the other case, the user attributes, enrollment identifier, and organization may all need to be hidden, 260. Here, the chaincode (application) can use a mechanism similar to that used when user attributes are incorporated in fabric transaction certificates. That is, attributes can be encrypted inside the certificate with a key the user and the chaincode agreed on at the user's first registration, 265. Such keys, followed with the user's signature on them, are stored persistently with the chaincode's off-chain data.

In both cases, chaincode stores the resulting membership credential in the local database with the respective request, and returns to the user the credential inside a proposal response message, 270. Notably, the credential may identify the blockchain the certificate is meant to be used for, or a timestamp, or both, that may be accessed by orderers when the certificate is used to represent the creator of a transaction. In addition, the owning application may need to set up a custom MSP and declare its configuration in the channel in which the application chaincode is deployed, 280. For example, the custom MSP may need to include as root or intermediate CA the certificate corresponding to the key the chaincode handles. The custom MSP may also need to check that the chain listed in the certificate corresponds to the chain under consideration. The custom MSP may further need to check, when the certificate is validated, that it has not expired. Further, the admins may match the admins of the current default fabric MSP. The custom MSP may use additional data (e.g., private input provided to the chaincode and thence to the MSP functions) to assess ownership of certain credentials from the user perspective.

Figure 3:
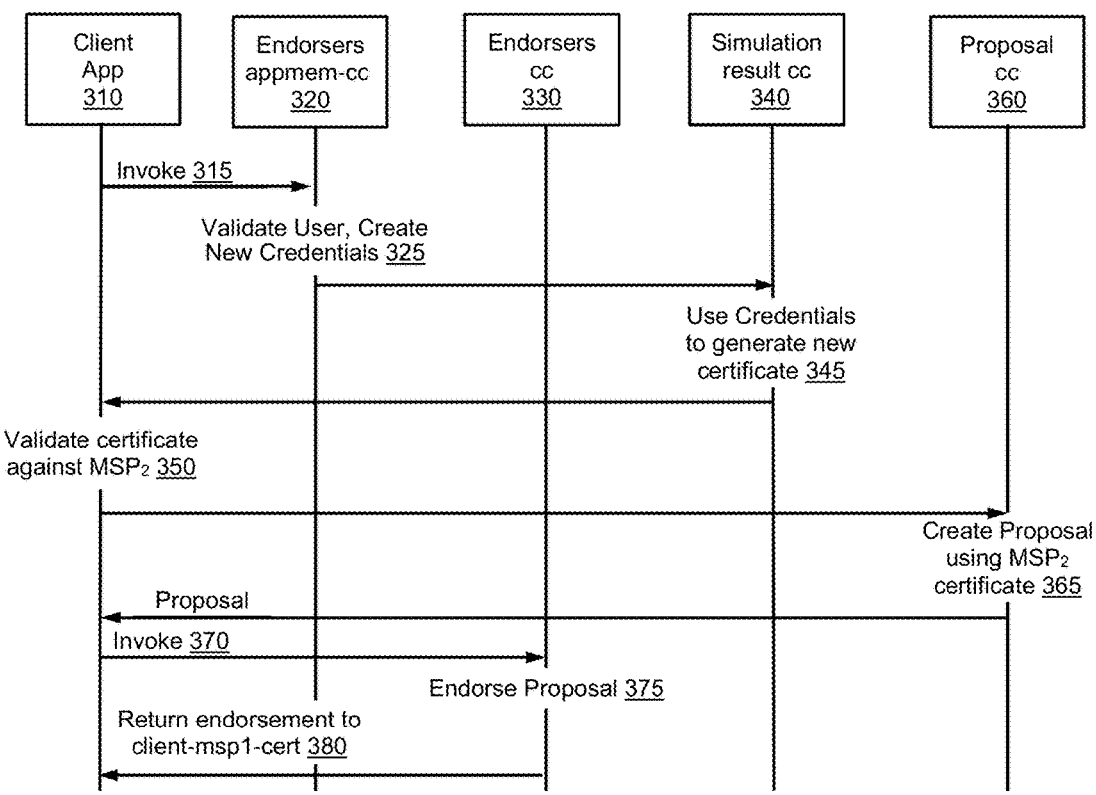
FIG. 3 is a diagram of transaction flow in an exemplary embodiment.

FIG. 3 is a diagram of transaction flow 300 in an exemplary embodiment in which a client with a credential under $MSP_1$, submits a transaction to a chaincode ("cc") that accepts invocations coming from certificates belonging to $MSP_2$. A single channel C supports both $MSP_1$, and $MSP_2$, and may also support the MSPs of other organizations as well. Chaincode cc is part of an application (hereinafter, "App") that leverages the client software development kit (SDK). In this context, a software development kit is a set of tools that allows the creation or modification of applications in chaincode to provide advanced functions.

App has set up its peers (which adhere to $MSP_2$) to have cc available for endorsement. App has also installed to its peers the preparatory chaincode appmem-cc, configured to convert $MSP_1$ certificates to $MSP_2$ certificates. The appmem-cc is also instantiated in channel C, but its initial state is considered private. That is, appmem-cc is enhanced with a mapping table between users of $MSP_1$ and the attributes, roles, and permissions granted to them in App that need to be part of corresponding credentials that comply with $MSP_2$.

Let "endorsers appmem-cc" 320 and "endorser cc" 330 denote endorsers satisfying the endorsement policies of appmem-cc and the endorsement policies of cc, respectively. App 310, running on the client side of $MSP_1$ client, follows the following steps. First, the client App 310 invokes 315 endorsers-appemem-cc to generate a cryptographically signed request to create new $MSP_2$ compliant credentials using information from its client $MSP_1$ credentials. Endorsers appmem-cc 320 validates the user using $MSP_1$ instantiation on the chain, obtains a list of attributes that need to be integrated inside the requested new client credentials, and creates the new credentials, 325. Chaincode app "simulation-result-cc" 340 uses the new credentials to generate client-msp2-cert, a new certificate for client App 310's use under $MSP_2$, 345. In other words, invoking endorsers-appmem-cc 320 results in the creation of new $MSP_2$ compliant credentials and a new certificate client-msp2-cert 345.

Client App 310 validates client-msp2-cert against $MSP_2$, constructs a transaction using the $MSP_2$ compliant client credentials, and invokes endorsers-cc 330 to endorse it. In particular, the client App 310 invokes proposal-cc 360 to create a proposal using client-msp2-cert, 365. The client App 310 then invokes endorsers-cc 330 to endorse the proposal, 370. Endorsers-cc 330 endorses the proposal using the validated $MSP_2$ 350 compliant credentials, 375, and returns the endorsement to client-msp1-cert, 380.

In the case the parties to the transaction need to be hidden but the actual data being exchanged doesn't, then endorsers-cc can be invoked by any member in C. In the case the role of the user may be revealed, but its true identity or the attributes bound to it may not be revealed, the foregoing logic can be executed by any party.

Figure 4:
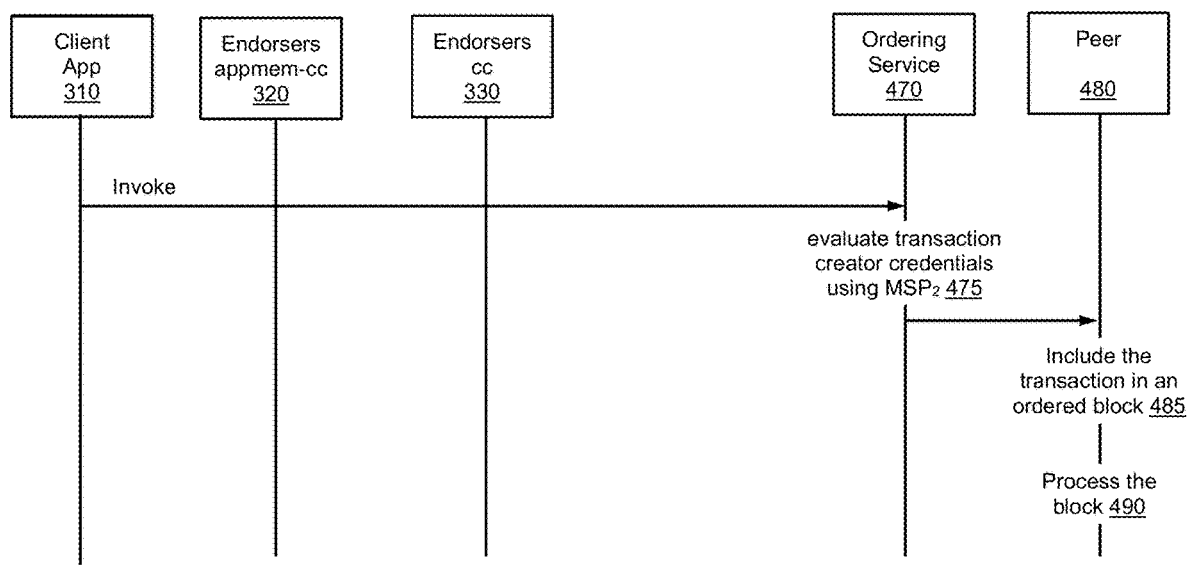
FIG. 4 is a transaction flow diagram showing exemplary operations to complete the endorsed proposed transaction of FIG. 3.

FIG. 4 is a transaction flow diagram 400 showing exemplary operations to complete the endorsed proposed transaction of FIG. 3. Client App 310 sends a message regarding the transaction, with the endorsements and client-msp2-cert, to ordering service 470. The ordering service evaluates the credentials of the transaction creator using $MSP_2$. 475. The ordering service rejects the transaction if the certificate corresponds to a different blockchain (i.e., organization), or approves it if it corresponds to the ordering service's blockchain. If approved, the ordering service's committing peer 480 includes the transaction in an ordered block, 485. The committing peer then processes the transaction, 490, following the rules of the hyperledger fabric.

Certain capabilities of the foregoing embodiments may be extended. For example, useful extensions may include the ability to audit transactions executed according to the foregoing. This may be enabled by providing that endorsers-appmem-cc can store a copy of the actual request internally, for example, in an off-chain database. A hash of this request can be part of the publicly available database, while the pre-images may be distributed only to properly authorized peers.

Another extension pertains to a distribution of trust in the certificate conversion process. For example, rather than responding with the full certificate, endorsers-appmem-cc can be configured to respond with a share of the certificate. Forming a consortium comprising a threshold number of endorsers by endorsers-appmem-cc would then be required for the full certificate to be reconstructed by the client. In this way one can distribute the establishment of trust in the certificate conversion process.

Integration of attributes in issued credentials may also be accomplished by endorsers-appmem-cc integrating, into the anonymous certificates, attributes associated with the user's role in the system.

And, role-based access control may also be implemented, such as by enhancing chaincode (for example endorsers-appmem-cc) with information of the keys needed to look up data associated with the roles of a certain enrolled user. A client proposal can then invoke chaincode to trigger appmem-cc to incorporate the roles of the client inside the newly issued client-certificate.

There are many usage cases the foregoing approaches may be used in. For example, appropriate portions of the foregoing may be included in applications related to trade, finance, supply chain management, and the like, built to run on a hyperledger fabric. Of course, the application is not limited to any particular use case(s).

The disclosed embodiments may be implemented in hardware, in a computer program executed by a processor, in firmware, or a combination of these. A computer program may be stored on a tangible computer readable storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to a processor such that the processor may read information from, and write information to, the storage medium. In embodiments, the storage medium may be integral to the processor. In embodiments, the processor and the storage medium may reside in an application specific integrated circuit ("ASIC").

Figure 5:
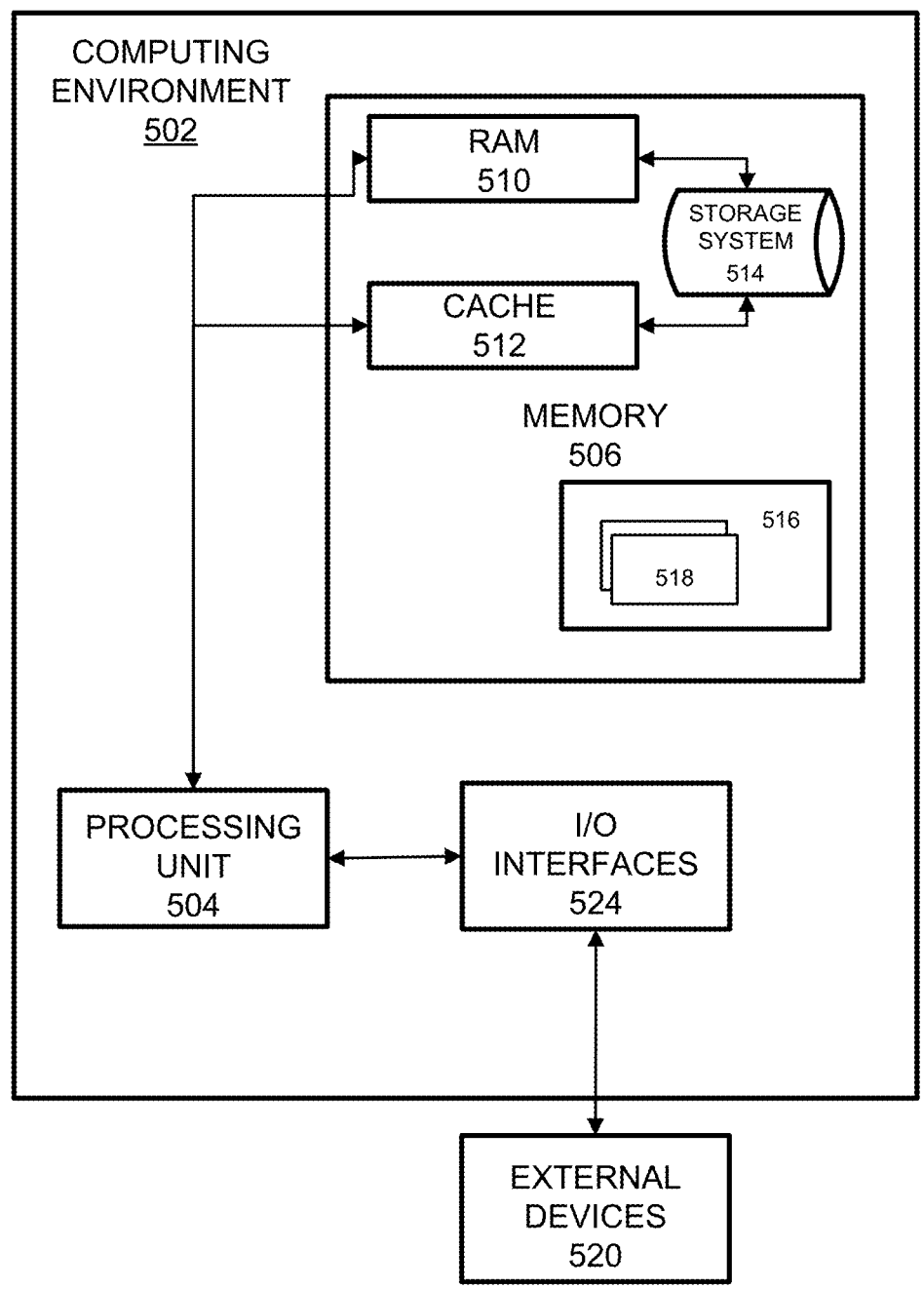
FIG. 5 illustrates an example computing environment architecture 500, with which aspects of the disclosure may be realized.

FIG. 5 illustrates an example computing environment architecture 500, with which aspects of the disclosure may be realized. FIG. 5 is not limiting as to the scope of use or functionality of the embodiments described herein. Rather, computing environment 500 is simply an example computing environment. Those of skill in the art will recognize many other configurations and elements may alternatively or additionally be used to realize various aspects of the described embodiments. Computing environment 502 may include, but is not limited to, one or more processors or processing units 504, a system memory 506, and a bus that couples various components together, for example coupling system memory 506 to processor 504.

Computing environment 502 may include a variety of computer readable media, such as volatile and non-volatile media, programmable memory, and the like. For example, system memory 506 can include computer system readable media in the form of volatile memory, such as random-access memory (RAM) 510 and/or cache memory 512. Computing environment 502 may further include other removable/non-removable, volatile/non-volatile computer system storage media. By way of example only, storage system 514 may be provided for reading from and writing to a non-removable, non-volatile magnetic media. As will be further depicted and described below, memory 506 may contain at least one program 516 comprising a set of program modules 518 that are configured to carry out the functions of various embodiments described. Data storage media may also contain an operating system, one or more application programs, other program modules, program data, and the like.

As will be appreciated by one skilled in the art, aspects of the present disclosure may be embodied as a system, method, or computer program product. Accordingly, aspects of the present application may take the form of an entirely hardware embodiment, or an embodiment combining software elements (including firmware, resident software, micro-code, etc.) stored and executed on hardware that may generally be referred to as a "circuit," "module" or "system." Furthermore, aspects of the present application may take the form of a computer program product embodied in a computer readable medium having computer readable program code embodied thereon.

Computing environment 502 may also communicate with one or more external devices 520. Via one or more input/output (I/O) interfaces 524. Such devices may include an antenna for receiving OTA updates, and for sending and receiving various messages. I/O interfaces 524 may also include one or more network interfaces to allow computing environment 502 to communicate with other computing devices on one or more networks.

Although exemplary embodiments of at least one of a system, method, and non-transitory computer readable medium have been illustrated in the drawings and described in the foregoing detailed description, it will be understood that the application is not limited to the embodiments disclosed, but is capable of numerous rearrangements, modifications, and substitutions. For example, the methods, systems, and apparatuses disclosed herein may be implemented in localized or distributed forms consistent with computing technology.

Although the application has been described and illustrated in exemplary forms with a certain degree of particularity, it is noted that the description and illustrations have been made by way of example only. Numerous changes in the details of construction, combination, and arrangement of parts and steps may be made without deviating from the scope of the application. Accordingly, such changes are understood to be inherent in the disclosure. The application is not limited except by the appended claims and the elements explicitly recited therein. The scope of the claims should be construed as broadly as the prior art will permit. It should also be noted that all elements of all of the claims may be combined with each other in any possible combination, even if the combinations have not been expressly claimed.

What is claimed is:

1. A method for evaluating a membership conversion proposal submitted by a client application (App) on a client that is subject to a first membership services provider ($MSP_1$) of a first organization, the method comprising:
    evaluating a validity of the client according to membership rules associated with a channel supporting $MSP_1$ and a second membership services provider ($MSP_2$) of a second organization using a preparatory application membership chaincode (appmem-cc) instantiated in the channel, the appmem-cc comprising a table mapping $MSP_1$ information necessary for compliance with the $MSP_2$;
    generating, using the appmem-cc, a request to create $MSP_2$ compliant credentials using information from $MSP_1$ credentials of the client;
    generating, using the appmem-cc, new credentials for the client including the information necessary for compliance with the $MSP_2$;
    generating a new certificate for the $MSP_2$ based on the new credentials;
    validating the new certificate against the $MSP_2$;
    constructing the membership conversion proposal using the new certificate; and
    requesting endorsement of the membership conversion proposal.

2. The method of claim 1, further comprising:
    determining a privacy requirement of a user associated with the first organization; and
    in response to determining that only an identity of the first organization needs to be hidden:
    mapping user characteristics information not pertaining to the first organization to membership characteristics information of the new credentials, and
    acquiring an inherent namespace derived by chaincode; or
    in response to determining that attributes associated with the user, an enrollment identifier, and an identity of the first organization all need to be hidden:
    encrypting the user attributes, the enrollment identifier, and the identity of the first organization inside the new certificate;
    storing the new credentials in a local database with the membership conversion proposal; and
    returning the new credentials to the client inside a proposal response message.

3. The method of claim 2, wherein:
    the new credentials contain information identifying at least one of:
        a blockchain for which the newly generated certificate is intended, and
        a timestamp; and
    wherein the method further comprises:
        accessing the information by transaction orderers when the new certificate is used to represent a creator of a transaction.

4. The method of claim 1, wherein the method further comprises:
    setting up a new MSP and declaring its configuration in the channel;
    including, by the new MSP, a certificate corresponding to a cryptographic key of the client App chaincode as a root or intermediate certificate authority (CA);
    checking, by the new MSP, that a blockchain listed in the transaction certificate corresponds to a blockchain associated with membership conversion proposal; and
    checking, by the new MSP, that the transaction certificate has not expired when it is validated.

5. The method of claim 1, wherein:
    submitting, by the client App a transaction to chaincode (cc) that accepts invocations from certificates compliant with $MSP_2$, wherein the client is compliant with $MSP_1$;
    setting up, by the client App, $MSP_2$ compliant peers with chaincode for endorsing transaction proposals from the client;
    installing, by the client App, the appmem-cc on the $MSP_2$ compliant peers, the appmem-cc configured to convert $MSP_1$ certificates to $MSP_2$ certificates; and
    instantiating, by the client App, the appmem-cc in the channel with a table that maps attributes, roles, and permissions of clients compliant with $MSP_1$, to attributes, roles, and permissions needed to be compliant with $MSP_2$.

6. The method of claim 5, wherein:
    invoking, by the client App, endorsers (appmem-cc endorsers) satisfying endorsement policies of the appmem to generate a cryptographically signed request to create new $MSP_2$ compliant credentials using information from client $MSP_1$ credentials of the client App.

7. The method of claim 6, wherein:
    validating, by an appmem-cc endorser of the appmem-cc endorsers, the $MSP_1$ compliant client;
    obtaining, by the appmem-cc endorser, a list of attributes that need to be included in new $MSP_2$ compliant credentials; and
    creating, by the appmem-cc endorser, the new $MSP_2$ compliant credentials,
    wherein the new credentials are used to generate a new certificate (client-msp2-cert) for client App's use under $MSP_2$ (client-msp2-cert), and
    wherein the method further comprises:
        validating, by the client App, the client-msp2-cert against the $MSP_2$;
        constructing, by the client App, a transaction using the $MSP_2$ compliant client credentials; and
        invoking, by the client App, chaincode on endorsers under $MSP_2$ to endorse the transaction.

8. A system to evaluate a membership conversion proposal submitted by a client application (App) on a client that is subject to a first membership services provider ($MSP_1$) of a first organization, the system comprising:
    a memory storing instructions; and
    a processor that when executing the instructions is configured to:
        evaluate a validity of the client according to membership rules associated with a channel supporting $MSP_1$ and a second membership services provider ($MSP_2$) of a second organization using a preparatory application membership chaincode (appmem-cc)

instantiated in the channel, the appmem-cc comprising a table mapping $MSP_1$ information necessary for compliance with the $MSP_2$, generate, using the appmem-cc, a request to create $MSP_2$ compliant credentials using information from $MSP_1$ credentials of the client, generate, using the appmem-cc, new credentials for the client including the information necessary for compliance with the $MSP_2$, generate a new certificate for the $MSP_2$ based on the new credentials, validate the new certificate against the $MSP_2$;

construct the membership conversion proposal using the new certificate, and request endorsement of the membership conversion proposal.

9. The system of claim 8, wherein the processor is further configured to:

determine a privacy requirement of a user associated with the first organization; and in response to a determination that only an identity of the first organization needs to be hidden:

map user characteristics information not pertaining to the first organization to membership characteristics information of the new credentials, and acquire an inherent namespace derived by chaincode; or in response to a determination that attributes associated with the user, an enrollment identifier, and an identity of the first organization all need to be hidden:

encrypt the user attributes, the enrollment identifier, and the identity of the first organization inside the new certificate;

store the new credentials in a local database with the membership conversion proposal; and return the credentials to the client inside a proposal response message.

10. The system of claim 9, wherein:

the new credentials contain information identifying at least one of:

a blockchain for which the newly generated certificate is intended, and a timestamp; and wherein the processor is further configured to:

access the information by transaction orderers when the new certificate is used to represent a creator of a transaction.

11. The system of claim 8, wherein the processor is further configured to:

set up a new MSP and declare its configuration in the channel, wherein the new MSP is configured to:

include a certificate corresponding to a cryptographic key of the client App chaincode as a root or intermediate certificate authority (CA);

check that a blockchain listed in the transaction certificate corresponds to a blockchain associated with membership conversion proposal; and check that the transaction certificate has not expired when it is validated.

12. The system of claim 8, wherein:

the client App is configured to submit a transaction to chaincode (cc) that accepts invocations from certificates compliant with $MSP_2$, wherein the client is compliant with $MSP_1$;

the client App is configured to set up $MSP_2$ compliant peers with chaincode to endorse transaction proposals from the client;

the client App is configured to install the appmem-cc on the $MSP_2$ compliant peers, the appmem-cc configured to convert $MSP_1$ certificates to $MSP_2$ certificates; and the client App is configured to instantiate the appmem-cc in the channel with a table that maps attributes, roles, and permissions of clients compliant with $MSP_1$, to attributes, roles, and permissions needed to be compliant with $MSP_2$.

13. The system of claim 12, wherein the client App is configured to:

invoke endorsers (appmem-cc endorsers) satisfying endorsement policies of the appmem-to generate a cryptographically signed request to create new $MSP_2$ compliant credentials using information from client $MSP_1$ credentials of the client App.

14. The system of claim 13, wherein an appmem-cc endorser is configured to:

validate the $MSP_1$ compliant client;

obtain a list of attributes that need to be included in new $MSP_2$ compliant credentials; and create the new $MSP_2$ compliant credentials, wherein the new credentials are used to generate a new certificate (client-msp2-cert) for client App's use under $MSP_2$ (client-msp2-cert), and wherein the client App is further configured to:

validate the client-msp2-cert against the $MSP_2$, construct constructs a transaction based on the $MSP_2$ compliant client credentials, and invoke chaincode on endorsers under $MSP_2$ to endorse the transaction.

15. A non-transitory computer readable medium comprising instructions for evaluating a membership conversion proposal submitted by a client application (App) on a client that is subject to a first membership services provider ($MSP_1$) of a first organization that when executed by a processor configures the processor to perform:

evaluating a validity of the client according to membership rules associated with a channel supporting $MSP_1$ and a second membership services provider ($MSP_2$) of a second organization using a preparatory application membership chaincode (appmem-cc) instantiated in the channel, the appmem-cc comprising a table mapping $MSP_1$ information necessary for compliance with the $MSP_2$;

generating, using the appmem-cc, a request to create $MSP_2$ compliant credentials using information from $MSP_1$ credentials of the client;

generating, using the appmem-cc, new credentials for the client including the information necessary for compliance with the $MSP_2$;

generating a new certificate for the $MSP_2$ based on the new credentials;

validating the new certificate against the $MSP_2$;

constructing the membership conversion proposal using the new certificate; and requesting endorsement of the membership conversion proposal.

16. The non-transitory computer readable medium of claim 15, wherein the instructions further configure the processor to perform:

determining a privacy requirement of a user associated with the first organization; and in response to determining that only an identity of the first organization needs to be hidden:

mapping user characteristics information not pertaining to the first organization to membership characteristics information of the new credentials, and acquiring an inherent namespace derived by chaincode; and in response to determining that attributes associated with the user, an enrollment identifier, and an identity of the first organization all need to be hidden:

encrypting the user attributes, the enrollment identifier, and the identity of the first organization inside the new certificate;

storing the new credentials in a local database with the membership conversion proposal; and returning the new credentials to the client inside a proposal response message.

17. The non-transitory computer readable medium of claim 16, wherein:

the new credentials contain information identifying at least one of:
a blockchain for which the newly generated certificate is intended, and
a timestamp; and wherein the method further comprises:
accessing the information by transaction orderers when the new certificate is used to represent a creator of a transaction.

18. The non-transitory computer readable medium of claim 15, wherein the method further comprises:

setting up a new MSP and declaring its configuration in the channel;

including, by the new MSP, a certificate corresponding to a cryptographic key of the client App chaincode as a root or intermediate certificate authority (CA);

checking, by the new MSP, that a blockchain listed in the transaction certificate corresponds to a blockchain associated with membership conversion proposal; and checking, by the new MSP, that the transaction certificate has not expired when it is validated.

19. The non-transitory computer readable medium of claim 15, wherein the instructions further configure the processor to perform:

submitting, by the client App a transaction to chaincode (cc) that accepts invocations from certificates compliant with $MSP_2$, wherein the client is compliant with $MSP_1$;

setting up, by the client App, $MSP_2$ compliant peers with chaincode for endorsing transaction proposals from the client;

installing, by the client App, the appmem-cc on the $MSP_2$ compliant peers, the appmem-cc configured to convert $MSP_1$ certificates to $MSP_2$ certificates; and instantiating, by the client App, the appmem-cc in the channel with a table that maps attributes, roles, and permissions of clients compliant with $MSP_1$, to attributes, roles, and permissions needed to be compliant with $MSP_2$.

20. The non-transitory computer readable medium of claim 19, wherein the instructions further configure the processor to perform:

invoking, by the client App, endorsers (appmem-cc endorsers) satisfying endorsement policies of the appmem-to generate a cryptographically signed request to create new $MSP_2$ compliant credentials using information from client $MSP_1$ credentials of the client App;

obtaining, by the appmem-cc endorser, a list of attributes that need to be included in new $MSP_2$ compliant credentials; and creating, by the appmem-cc endorser, the new $MSP_2$ compliant credentials, wherein the new credentials are used to generate a new certificate (client-msp2-cert) for client App's use under $MSP_2$ (client-msp2-cert), and wherein the instructions further configure the processor to perform:

validating, by the client App, the client-msp2-cert against the $MSP_2$;

constructing, by the client App, a transaction using the $MSP_2$ compliant client credentials; and invoking, by the client App, chaincode on endorsers under $MSP_2$ to endorse the transaction.

* * * * *